United States Patent [19]

Hori

[11] Patent Number: 4,892,850
[45] Date of Patent: Jan. 9, 1990

[54] TOUGH CORUNDUM-RUTILE COMPOSITE SINTERED BODY

[75] Inventor: Saburo Hori, Tokyo, Japan

[73] Assignee: Kureha Chemical Industry Co., Ltd., Tokyo, Japan

[21] Appl. No.: 117,532

[22] Filed: Nov. 6, 1987

[30] Foreign Application Priority Data

Nov. 7, 1986 [JP] Japan ................................. 61-265329

[51] Int. Cl.$^4$ ....................... C04B 35/10; C04B 35/46
[52] U.S. Cl. .................................... 501/127; 501/134
[58] Field of Search ................ 501/127, 134; 423/598, 423/600

[56] References Cited

U.S. PATENT DOCUMENTS

| | | | |
|---|---|---|---|
| 4,306,909 | 12/1981 | Oda et al. | 501/127 |
| 4,430,440 | 2/1984 | Wada et al. | 501/127 |
| 4,746,638 | 5/1988 | Hori et al. | 501/127 |

FOREIGN PATENT DOCUMENTS

| | | |
|---|---|---|
| 3633030 | 4/1987 | Fed. Rep. of Germany . |
| 0867908 | 9/1981 | U.S.S.R. ............................... 501/127 |

OTHER PUBLICATIONS

Kim et al, "Studies in Lithium Oxide Systems", Journal of the American Ceramic Society, vol. 43, No. 12, (1960) pp. 611–614.

Fullman, "Measurement of Particle Size in Opaque Bodies", Transactions AIME, Journal of Metals, pp. 447–452, Mar. 1953.

Hori et al, "Preparation of Codeposited $Al_2O_3$—$TiO_3$ Powders by Vapor Phase Reaction Using Combustion Flame", Yogyo-Kyokai Shi, vol. 94, No. 4, pp. 400–408 (1986).

Niihara, Ceramics, vol. 20, No. 1, pp. 12–18 (1985).

Faber et al, "Crack Deflection Processes-I. Theory", Acta Metall., vol. 31, No. 4, pp. 565–576 (1983).

Faber et al, "Crack Deflection Processes-II. Experiment", Acta Metall., vol. 31, No. 4, pp. 577–584 (1983).

Kanzaki et al, "Precipitation Strengthening in Alumina-Rich Mg—Al Spinel Ceramic", Yogyo-Kyokai Shi, vol. 88, No. 7, pp. 411–417 (1980).

Ruf et al, "Toughening by Monoclinic Zirconia", Journal of the American Ceramic Society, vol. 66, No. 5, pp. 328–332, May 1983.

Okamura et al, "Preparation and Sintering of Monosized $Al_2O_3$—$TiO_2$ Composite Powder", Journal of the American Ceramic Society, vol. 69, No. 2, pp. C-2-2-C-24, Feb. 1986.

Primary Examiner—Mark L. Bell
Assistant Examiner—Anthony J. Green
Attorney, Agent, or Firm—Lowe, Price, LeBlanc, Becker & Shur

[57] ABSTRACT

A sintered body formed of corundum-alumina and rutile-titania which is prepared by adding an alkali metal to an alumina-titania composite powder produced by a vapor-phase reaction of $AlCl_3$ and $TiCl_4$, in the course of the oxidation reaction or by some treatment of the powder after the reaction; and sintering the powder at a temperature not lower than a minimum temperature at which a liquid phase is produced by a small amount of alkali metal oxide and titania and not higher than 1280° C. has the characteristics which have never been obtained before.

The sintered body of the present invention comprises alumina of corundum phase and titania of rutile phase, which contains alkali metal in an amount of 0.01 to 0.5 wt % and plate-shaped corundum particles whose cross sections having aspect ratios of 2.5 or more are observed to be 10 vol % or more by scanning electron micrography. This sintered body can have a high toughness by the compounding inexpensive oxides such as alumina and titania.

The toughening mechanism of the present sintered body is due to a crack deflection effect by geometrically anisotropic particles which are dispersed in the material, and therefore the toughness is not expected to be deteriorated at high temperatures.

9 Claims, 4 Drawing Sheets (× 1000)

(× 1000)

(x1000)

(x1000)

TOUGH CORUNDUM-RUTILE COMPOSITE SINTERED BODY

FIELD OF THE INVENTION

This invention relates to an inorganic oxide sintered body of high fracture toughness, which is suitably usable as ,a material for machine parts etc. which must withstand heat, abrasion and mechanical impacts.

RELATED ARTS

Inorganic polycrystalline sintered bodies, i.e. ceramics in a narrow sense, have recently made remarkable progress and have brought various improvements in mechanical or thermal applications thereof. Brittleness, which has been a fatal defect of tee ceramics when they are used for mechanical applications, is being overcome by the development of highly tough ceramics.

Materials which have been known as ceramics of high toughness include oxide ceramics such as partially-stabilized zirconia (PSZ) which is toughened by phase transformation, or zirconia-toughened alumina which is toughened by utilizing transformation of zirconia and micro-cracking following the zirconia transformation, and non-oxide ceramics such as silicon nitride ($Si_3N_4$)

Of these ceramics, the non-oxide ceramics are so expensive that the applications thereof have been limited. In this respect, the oxide ceramics, which are available at a rather reasonable cost, are desirable. However, zirconia is not cheap, but rather expensive, among the oxide ceramics, and the ceramics which have been toughened by utilizing phase transformation of zirconia are disadvantageous in that their toughness depends upon temperature. More particularly, the toughness of such ceramics is remarkably lowered at high temperatures even if they can show considerable toughness at room temperature.

Hence, there is a demand for ceramic materials which are not expensive and yet can show high toughness even at high temperatures.

Meanwhile, crack-deflection toughening has been recently proposed as a method for toughening brittle materials such as ceramics (see K. T. Faber and A. G. Evans, Acta Metall., 31 565–76 (1983)).

In the mechanism of this crack-deflection toughening, the propagating crack is deflected by the interaction between crack and grain. Therefore, the larger the shape anisotropy, the larger the toughening effect will be. For example, this toughening technique is effective for materials in which rod-shaped particles having a large ratio of length to diameter or plateshaped particles having a large ratio of diameter to thickness are dispersed. This toughening mechanism by the crack-deflection toughening is hardly influenced by temperature and can maintain high toughness even at high temperatures, which can meet industrial requirements.

To prepare a sintered body toughened by the crack deflection as described above, it is not advantageous to blend powders of high shape anisotropy as a starting material, because these particles are difficult to be shaped and/or sintered. It is therefore preferred that the starting materials be some suitable spherical particles which may be developed into grains of high shape anisotropy, through grain growth, precipitation, phase transformation or reaction, during or after sintering.

There has been reported, for example by K. T. Faber and A. G. Evans, Acta Metall., 31 577 (1983)), a good result with non-oxide ceramics such as silicon nitride, in which particles of high shape anisotropy have been developed by the sintering or heat treatment after the sintering to improve the toughness.

There is another report with respect to oxide ceramics that Mg-Al spinel sintered body in excess of alumina are sintered at a high temperature where alumina forms a solid solution with spinel and heat-treated at a temperature of 1000° or 1150° C. to exsolute fine lath-like alumina crystals, thus improving the toughness of the ceramics (Kanzaki, Hamano, Nakagawa and Saito, Yogyo-Kyokai-Shi 88 (7) 411(1980)). The toughening mechanism in this report has been proposed to be a primary crack pinning or crack bowing effect by the second phase, but it may partially be due to the crack deflection effect. The improved fracture toughness as reported by Kanzaki et al is only 1.4 times as much as the toughness of the ceramics which have not been subjected to toughening treatment and shows a fracture toughness ($K_{Ic}$) not higher than 4.7 MPa·m$^{\frac{1}{2}}$. Thus, these materials should never be highly tough.

Another example of oxide ceramics which have been toughened by the crack deflection has been reported with respect to $ZnO-ZrO_2$ by Ruf et al. (H. Ruf and A. G. Evans, J. Am. Ceram Soc., 66 (5) 328–332(1983)). The crack deflection effected in the case of Ruf et al. has not been supposed to be due to the shape anisotropy of dispersed particles but to the interaction between the residual stress around dispersed particles and the crack. The fracture toughness ($K_{Ic}$) has been improved up to 1.7 times as much as that of the material in which there are no particles dispersed. However, the maximum value of $K_{Ic}$ attained is still as low as about 3MPa·m$^{\frac{1}{2}}$ and cannot provide high toughness.

As described above, there are hardly found, in the oxide ceramics, polycrystalline sintered bodies which have been toughened by crack deflection and if any, the effect of toughening is still unsatisfactory.

SUMMARY OF THE INVENTION

It is therefore an object of the present invention to provide ceramics which are made of inexpensive oxide components and toughened by the crack deflection mechanism, which is hardly deteriorated even at high temperatures, and a method for preparing the same.

The inventors of the present invention have studied the alumina-titania composite powder as disclosed in their previous application (Japanese Patent Application No. 60-214237 and U.S. patent application Ser. No. 912,512) and investigated effective additives and preferred sintering conditions for improving the sinterability and the microstructure, and finally attained the present invention.

The present invention features a corundum-rutile composite sintered body of high toughness consisting of alumina of corundum phase and titania of rutile phase, which contains alkali metal in oxide form in an amount of 0.01 to 0.5 wt % and plate-shaped corundum particles whose cross sections having aspect ratios of 2.5 or more are observed to be 10 vol % or more by scanning electron microscopy.

The invention further features a method for preparing a corundum-rutile composite sintered body of high toughness comprising alumina of corundum phase and titania of rutile phase, which contains an alkali metal in an amount of 0.01 to 0.5 wt % and plate-shaped corundum particles whose cross sections having aspect ratios of 2.5 or more are observed to be 10 vol % or more by scanning electron microscopy, which method comprises:

mixing 0.01 to 0.5 wt % of an alkali metal with an alumina-titania composite powder prepared by an oxidation reaction of a vapor mixture of $AlCl_3$ and $TiCl_4$ within combustion flame, in the course of the vapor phase reaction phase for producing the powder by the oxidation, to form solid solution of the alkali metal into the composite powder or to let the alkali be adsorbed on the surfaces of the powder resulted from the oxidation, for incorporating the alkali metal into the alumina-titania composite powder;

subjecting the resulting powder to atmospheric sintering, after shaping of the powder, at a temperature higher than a minimum temperature, at which a liquid phase is formed by a small amount of alkali metal oxide and titania, and lower than 1280° C., or subjecting the powder to hot pressing.

DETAILED DESCRIPTION OF THE INVENTION

(Components Composing the Sintered Body)

Figure 1:
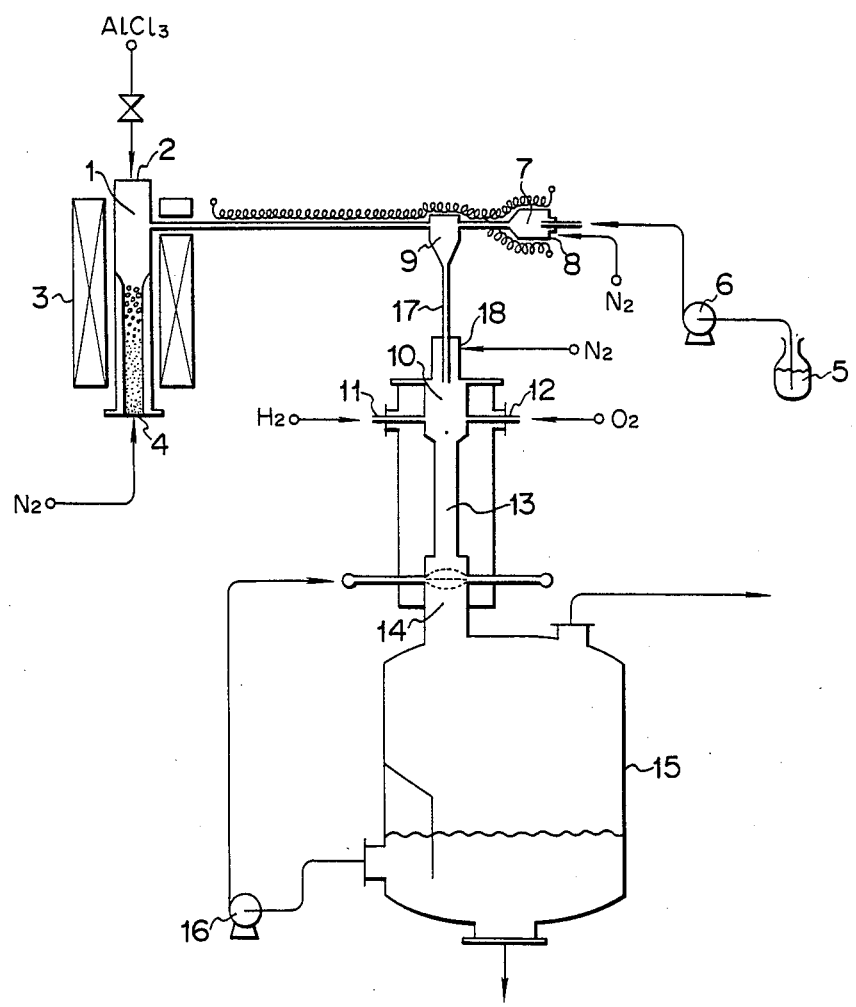
FIG. 1 is a flow diagram showing a process and apparatus for preparing alumina-titania composite powders which are subsequently pressed to obtain alumina-titania composite sintered bodies according to the present invention.

The corundum-rutile sintered body of high toughness according to the present invention has such a structure that thin plate-shaped corundum particles are dispersed in a matrix. It contains plate-shaped corundum particles whose cross sections having aspect ratios of 2.5 or more are observed to be 10 vol % or more by scanning electron microscopy (SEM).

In this respect, the length of the elongated cross section particles is a length of an intersection between the sectioning plane and an upper surface (or lower surface) of the plate-shaped corundum particle, while the width thereof is a width in which the plane is intercepted by the upper and lower surfaces of the plate corundum particle.

Even though the composition and the fabrication conditions may have some effect on the fracture toughness, it is most critical for the sintered body to contain 10 vol % or more of the plate-shaped corundum particles in order to achieve a fracture toughness exceeding 5 $MPa \cdot m^{\frac{1}{2}}$, which is considered to be a high toughness value as with ceramics. The content of these plate-shaped particles may preferably be 15 vol % or more. In this case, the toughness is further improved. The ratio of the diameter to the mess thickness of the plateshaped particles is preferred to be large to ensure the crack deflection toughening effect. This crack deflection toughening effect is also enhanced as the vol % of the plate-shaped particles becomes larger. However, if the plate-shaped particles become too large, strength will be deteriorated though the high toughness is maintained. By this reason, a mean diameter of plate particles which is obtained by Fullman's statistical treatment for dispersed thin discs (or plates) is preferably 50 μm or less.

In this connection, it is to be noted that if the plate-shaped corundum particles are small and their diameter is as small as a mean diameter of the titania particles, the crack propagation upon fracture will be similar to that in a sintered body which is formed only of titania particles of isotropic shape. Therefore, substantial effect of crack deflecting toughening is hardly expected. As described above, the crack deflection toughening effect will be lowered as the aspect ratio of the plate-shaped particles becomes smaller. Similarly, the toughening effect will be lowered as the ratio of the mean diameter of the plate-shaped corundum particle to the mean size of the rutile particles becomes smaller. To obtain sufficient effects, the mean size of the rutile particles is preferably one third or less than the mean diameter of the plate-shaped corundum particles. Of course, not all the corundum particles become plate-shaped but some of them remain in an isotropic shape. However, since the content of the isotropic corundum particles is relatively small and these isotropic corundum particles is smaller than the rutile particles, it will suffice to consider only the ratio of the mean diameter of the plate-shaped corundum particles to the mean size of the rutile particles.

The mean diameter of the corundum particles and the mean size of the rutile particles may be obtained by quantitative microscopy (or statistical treatments) such as Fullman's from a photograph of a ground surface of a test piece by a backscattered electron mode of scanning electron microscopy.

The content of $Al_2O_3$ (alumina) in the corundum-rutile composite sintered body is 10 composite sintered body is 10 to 90 wt % and more preferably 30 to 80 wt %. In order to contain 10 vol % or more (9.4 wt % or more when the remaining components are titania) of plate-shaped alumina particles of corundum phase, alumina should be employed at least in an amount of 10 wt %.

To obtain a sintered body free from aluminum titanate which deteriorates the strength and constituting mainly of corundum-alumina and rutile-titania, a composition which is capable of being sufficiently densified at a temperature lower than 1280° C. should be employed. For this purpose, the content of alumina should be 90 wt % or less because the sinterability is deteriorated if the content of alumina exceeds 90 wt %.

It is further essential in the present invention to incorporate an alkali metal into the sintered material in addition to alumina and titania. Addition of the alkali metal produces a liquid phase in the course of sintering. This liquid phase promotes the sintering even at a temperature below 1280° C. and the growth of plate-shaped corundum particles. The alkali should be contained at least in an amount of 0.01 wt % to attain sufficient densification and the growth of the plate-shaped corundum particles. However, if the content of the alkali metal exceeds 0.5 wt %, the liquid phase produced during the sintering remains mostly as glassy phase after the sintering, which weakens the interfaces of sintered particles and lowers the toughness and strength. Therefore, the content of the alkali metal should be within a range of 0.01 to 0.1 wt %.

In this respect, it is further to be noted that when the content of the alkali metal is 0.01 to 0.1 wt %, the growth of the plate-shaped particles can be achieved after sintering the materials for a long time, but the sufficient densification can not be attained. As a result of this, although the toughness might be improved, the strength is still unsatisfactory. Therefore, to impart not only high toughness but also high density and high strength, the content of the alkali is preferably 0.1 wt % to 0.5 wt %.

The formation of the liquid phase due to the added alkali metal during the sintering process can be inferred from a phase equilibrium diagram of an alkali metal oxide and titania ($TiO_2$) The minimum temperature, at which a liquid phase is formed by a slight amount of an alkali metal oxide and titania, depends upon a kind of the alkali metal employed, but, in general, from 1100° C. to 1250° C. as apparent from Table 1. As an example of alkali metals which are relatively easily available and have a low liquid-phase forming temperature, there may be mentioned sodium. Thus, sodium may most preferably be employed as an alkali metal to be added. The sintering temperature should be higher than the temperature at which a liquid phase is formed. When sodium is employed as an alkali metal, the sintering temperature should be 1130° C. or higher.

(Microstructural Development in Corundum-Rutile Composite Sintered Body and Requisites for Starting Powder Therefor)

A sintered body formed of corundum-alumina and rutile-titania and having a structure containing well-grown plate-shaped corundum particles may be produced by employing an easily sinterable alumina-titania composite powder added with a slight amount of alkali metal. However, it is difficult to prepare such a sintered material from a powder of low sinterability in which alumina and titania are simply mixed mechanically or a powder which does contain little alkali metal.

The starting powder should be such a powder which can be densified at a temperature lower than 1280° C. because the mixed or composite powder of alumina and titania produce aluminum titanate, which deteriorates the strength when they are sintered at a temperature higher than 1280° C.

As alumina-titania composite powders having a good sinterability, there have been known an alumina-titania composite powder as disclosed in our previous application (Japanese Patent Application No. 60-214237, U.S. patent application Ser. No.912,512) and a powder as disclosed by Okamura et al. (H. Okamura. E. A. Barringer and H. K. Bowen, J. Am. Ceram. Soc., 69 (2) C22-24(1986)). When these powders are shaped and sintered at a temperature lower than 1280° C., relatively dense sintered bodies are obtained. However, it is still difficult to attain the densification up to a relative density of 97% or more which is generally considered to be a requisite for structural ceramics, or to such an extent that the porosity is less than 3%. Furthermore, the growth of plate-shaped corundum particles can not be expected. For example, according to the report by Okura et al., the relative density for their powder has never been higher than 90% and no growth of plate-shaped particles has been observed even after sintering at 1280° C. for 20 hours. In the case of the alumina-titania composite powder as disclosed in our previous application, a relative density exceeding 92% has not been attained and no growth of plate corundum particles has been attained by the sintering at 1250° C., for example, for 6 hours, when no alkali metal is added.

When an alkali is added in an amount of 0.01 wt % or more to the alumina-titania composite powder of the previous application which has a relatively good sinterability, and the resultant mixture is shaped and sintered, the sintered body can be densified to such an extent that it has a relative density of 97% or more, to wit, a porosity of 3% or less, and can have well-grown corundum plate-shaped particles after sintering at a temperature lower than 1280° C.

There have been no report on a microstructure in which plate-shaped particles of corundum phase have grown in a fine-grained matrix formed of corundum-alumina and rutile-titania. Thus, the present invention provides a novel composite sintered body.

The reason why the plate-shaped corundum crystals grow in the present sintered material is not clear, but it may be inferred as follows: corundum grains are grown by Ostwald ripening after repetition of solid solution of corundum within rutile particles or into the boundaries with the rutile particles and recrystallization thereof; the crystallization has a growth directionality; and the alkali metal has some influence on the phenomena of solution and crystallization.

Starting materials for preparing such a corundum-rutile composite sintered body having a structure, in which plate-shaped corundum particles have grown, are required (1) to have a uniform mixture of alumina and titania; (2) to have a good sinterability; and (3) to be easy to nucleate the plate-shaped particles and make the growth of the particles. For uniformity, it is desirable that alumina and titania are both included in each particle of the starting powder. With respect to the sinterability, it is preferred that the average particle size be as small as 25 to 100 nm, but not too small to be handled easily; both alumina and titania be included in each of the particles and form solid solutions each other; and an adequate amount of alkali metal be contained in the powder. The solid solution of alumina in rutile is detected by a change of the lattice constant of the rutile crystal, and a lattice constant $c_0$ of 2.9580 or less is desirable, which can be attained by solid solution of alumina in an amount of about 0.5 wt % or more.

The nucleation of the plate-shaped corundum particles occurs when γ-alumina or δ-alumina or alumina, which has been included as a solid solution in a rutile crystal, is transformed into α-phase alumina. A crystalline phase or a solid solution condition might be an important factor in the nucleation. By this reason, an alumina-titania composite powder formed of γ- or δ-alumina and titania mainly comprising rutile-titania may be suitably employed in the present invention. The mutual solid solution of alumina and titania and addition of an alkali metal may promote nucleation and/or growth of nuclei. In particular, the addition of an alkali metal is very important for producing a liquid phase during sintering, improving sinterability and promoting nucleation and growth of nuclei.

The alumina-titania composite powder as disclosed in our previous application added with an adequate amount of alkali metal might be the most suitable as a powder which can satisfy all the requirements as described above. The content of the alkali metal is preferably from 0.01 to 0.5 wt % as described above. If the content is less than 0.01 wt %, the growth of the plate-shaped particles is hard to occur and if more than 0.5 wt %, other crystalline phases than corundum and rutile or a glassy phase might be formed, deteriorating the toughness of the sintered material.

An alkali metal is incorporated into the alumina-titania composite powder of our previous application in such a manner that (1) an alkali metal is admixed in the course of a vapor-phase reaction for producing a powder to let the alkali metal oxide form a solid solution into the composite powder, or (2) the alkali metal is allowed to be adsorbed on the surfaces of the produced powder.

For the method (1), there are no common alkali metal salts having a low boiling point and it is difficult to mix the alkali in the form of vapor into the vapor reaction. However, since the amount of the alkali metal to be added is only slight, a small amount of alkali chloride may be added to titanium tetrachloride which is used as a raw material for titania and fed into a reactor in the form of liquid or vapor. Or, a wall of a reactor may be made of a refractory material including an alkali metal. In this case, the alkali metal is mixed into the vapor phase in the form of alkali oxide evaporated from a solid phase or alkali chloride produced and evaporated by a reaction with hydrogen chloride gas, so that it is incorporated into the alumina-titania composite powder.

It is not always easy to strictly control the amount of the alkali metal, which is finally contained in the powder, according to the method of incorporating the alkali metal through the use of alkali metal-containing refractories. This method, however, is advantageous in that it is simple to carry out. As refractories employable in this method, there may be mentioned, for example, refractories which are made by using castable powder or a powder for ramming mix of partially-stabilized zirconia and sodium tripolyphosphate as a binder, and shaping and sintering these materials. These refractories release sodium gradually in an atmosphere having a high hydrogen chloride gas at high temperatures. As a result of this, sodium may be incorporated in the course of the reaction of producing the alumina-titania composite powder in a vapor phase and form a solid solution in the powder.

To carry out the method (2), for example, an adequate amount of sodium carbonate is dissolved in water and an alumina-titania powder is put into the solution, admixed well and then dried by evaporation.

Either of the methods (1) and (2) may suitably be employed in the present invention, but the method (1) is more advantageous in that a sintered material of high density and having grown plate particles can be obtained by a relatively small amount of alkali.

(Example of Preparation Processes)

An example of a process and an apparatus for carrying out the method (1) above will now be described, referring to FIG. 1.

The feedstocks employable in the present invention may be aluminum compounds and titanium compounds which are vaporized at a relatively low temperature. Among these, anhydrous aluminum chloride ($AlCl_3$) and titanium tetrachloride ($TiCl_4$) are preferred because of their proper vaporization temperatures and easiness in the treatment or disposal of by-products.

$AlCl_3$ is a solid at room temperature and has a of about 180° C. A vaporizer 1 of sublimating point fluidized bed type using $Al_2O_3$ particles as fluidized medium is employed. $AlCl_3$ is continuously or intermittently supplied from the upper part 2 of the vaporizer. The temperature of the vaporizer 1 is kept constant by an electric furnace 3. The feeding amount of $AlCl_3$ vapor into a reactor is determined by a vapor pressure of $AlCl_3$ and a flow rate of nitrogen gas ($N_2$) which is a carrier gas of $AlCl_3$ and supplied from the bottom 4 of the fluidized bed.

Since $TiCl_4$ is liquid at room temperature, it is supplied at a constant rate from a $TiCl_4$ reservoir 5 by a pump 6. $TiCl_4$ is vaporized by a vaporizer 7 which is kept at a temperature higher than a boiling point of $TiCl_4$, for example, by a ribbon heater and mixed with $N_2$ which is a carrier gas of $TiCl_4$ blown through a gas inlet 8.

A mixture of $AlCl_3$ and the carrier gas $N_2$ and a mixture of $TiCl_4$ and the carrier gas $N_2$ are fed into a mixing vessel 9 through tubes heated by some suitable heater such as a ribbon heater to a temperature high enough to prevent crystallization and/or condensation of $AlCl_3$ and $TiCl_4$, preferably to a temperature as high as 300° C. or higher. These gas mixtures are mixed in the mixing vessel 9 and blown into a mixing section 10 of the reactor.

Hydrogen ($H_2$) and oxygen ($O_2$) are also blown into the mixing section 10 through a gas inlet 11 and a gas inlet 12, respectively, to make a whirling flame extending horizontally. The mixing section 10 is kept at a temperature no lower than 1450° C. and lower than the melting point of aluminum titanate. If the mixing section 10 is lower than this specific temperature range, crystallization of alumina and/or titania does not proceed well, which increases an amorphous phase and deteriorates the sinterability. On the other hand, if the mixing section 10 is at a temperature higher than the temperature range, the products experience a molten state, which causes fusing of particles to each other. The powders thus produced can not have a good dispersibility required for molding. The temperature range is more preferably about 1550° C. to about 1700° C. It is noted that measuring temperatures of the reactive gases is difficult because the atmosphere contains corrosive gases. Therefore, the apparatus is operated with $H_2$, $O_2$ and $N_2$ flowing without feeding chlorides to obtain a relation between the reaction gas temperature and the refractories temperature by a thermocouple inserted in the reaction gas and a thermocouple embedded in a refractory lining of the reactor, so that the reaction gas temperature when chlorides are fed may be estimated from the refractories temperature.

The gas mixtures which have been mixed at the mixing section 10 and partially reacted are guided downstream to an elongated reaction section 13 to continue and complete the reaction.

The temperature of the reaction section 13 is kept about 800° C. or higher even at an end portion of the reaction section 13. If the temperature is lower than about 800° C., the oxidation reaction rate of $AlCl_3$, in particular, is considered to be too low.

A total residence time of the gas in the mixing section 10 and the reaction section 13 is not less than 20 msec and not more than 500 msec. It is preferably not less than 40 msec and not more than 200 msec. If the residence time is too short, the reaction can not be completed and if the residence time is too long, the agglomeration of the particles becomes significant, deteriorating the sinterability of the powders.

The powders contained in the gas leaving the reacting section 13 may be collected in a dry form or collected in a solvent such as water. However, even when the powders are collected in a dry form, they must be dispersed in water to eliminate foreign matters or coarse grits. Besides, the collecting efficiency is higher in the method of collecting in water. By these reasons, it is preferred to collect the powders in water.

The gas leaving the reaction section 13 is cooled nearly to room temperature at a quenching section 14. The quenching is carried out by pressurizing a slurry formed of water and powder from a bottom of a separating drum 15 and spraying it to the quenching section 14 by a pump 16.

The separating drum 15 effects gas-liquid separation. The major portion of the $Al_2O_3$-$TiO_2$ composite powder produced by the reaction is collected in water through the contact with water at the quenching section and the composite powers produced are drawn out from the bottom of the separating drum 15 as a slurry.

In addition, it is to be noted that the gas mixture is blown from the mixing vessel 9 to the mixing section 10 through a blowing nozzle 17 and it is preferred that $N_2$ for protecting the blowing nozzle be blown in from the outside 18 of the nozzle 17 to prevent clogging of the nozzle.

According to the method (1) above, refractories containing an alkali metal are used for the inner walls of the mixing section 10 and reacting section 13. Or, an alkali chloride may be mixed into $TiCl_4$ in the $TiCl_4$ reservoir 5 to supply the alkali chloride to the mixing section 10.

On the other hand, according to the method (2) above, there is no need to make the inner walls of the mixing section 10 and the reaction section 13 from refractories containing an alkali. In this method, an alumina-titania powder is prepared in a manner substantially the same as that of the previous application (Japanese Patent Application No. 60-214237) and then an alkaline salt is adsorbed by the prepared powder in a manner as described above. Thus, an alumina-titania composite powder containing an alkali metal is prepared and the powder is then molded and subjected to an atmospheric sintering at a temperature not lower than a minimum temperature at which a liquid phase is produced by a slight amount of alkali metal oxide and titania (for example, 1130° C. or higher when the alkali is sodium) and not higher than 1280° C. or subjected to a hot pressing to produce a corundum-rutile composite sintered material of high toughness.

(Determination of the Shape of the Plate Corundum Particle)

From the observation of fractured surfaces, it has been revealed that the plate-shaped corundum particles grown up in the corundum-rutile composite sintered body have a hexagonal plate shape. A volume fraction, a mean diameter, and a mean thickness of the plate-shaped corundum-particles may be obtained readily by approximating them to thin discs through a quantitative microscopic analysis of a structure of a polished surface.

In the composite sintered body comprising corundum and rutile, corundum grains and rutile grains are easily distinguished from each other in a SEM photograph when a section of the sintered body is polished and observed by a backscattered electron mode of SEM. This distinction is due to a difference in electron reflectivities between Al and Ti.

When randomly-oriented thin discs are cut by a plane, most of the cross sections assume an elongated shape and some assume an ellipse or a segment of an ellipse. In the sintered body including rutile grains of isotropic shape, corundum grains of a thin plate shape, and corundum grains having an isotropic shape which have not yet grown to plates, sufficiently elongated bar-like (typically, a ratio of the length to the width is 2.5 or more) sections observed in a given cut and polished surface of the sintered body are of plate-shaped corundum particles. As to sections of corundum particles which are observed rather isotropic, they may be classified into small sections of isotropic corundum grains which have not grown to plates and rather large sections which are observed when plate-shaped particles are sectioned at an angle nearly parallel to upper and lower surfaces of plate-shaped corundum grains because a diameter of the plate-shaped corundum particles is sufficiently larger than (typically, more than three times as large as) that of the isotropic corundum article and these two classified sections can be distinguished rather easily.

As described above, the sections of the corundum grains observed include three kinds of sections: sections cut at an angle relatively vertical with the upper and lower faces of the plate-shaped corundum grains and observed to be elongated shapes; sections cut at an angle nearly parallel with the upper and lower surfaces of the plate-shaped corundum grains and observed to be large ellipses or polygons; and sections of the corundum grains which have not grown into plates and observed to be small polygons.

To determine a volume percent of the plate-shaped corundum particles, an areal percentage of the sections of the plate-shaped corundum particles in a given section of the sintered body. In this specification, not only data which is obtained only from elongated sections (length-to-width ratio is 2.5 or more), but also data which is obtained both from the elongated sections and sections observed as large ellipses or polygons are shown.

The mean diameter and the mean thickness of the plate-shaped corundum particles are obtained by a method of Fullman (R. L. Fullman, Trans. AIME 197 447–452 (1953)), assuming that a particle size distribution of the plate-shaped particles is sufficiently small and the ratio of the diameter to the thickness is sufficiently large. A mean length $\bar{l}$ of intercepts of arbitrary straight lines which is cut by parallel two faces of a thin disc, a mean area s of elongated sections formed by the intersection between arbitrary planes and the thin disc, and a diameter d and thickness t of the thin disc have the following relationships therebetween:

$$\bar{l} = 2t$$

$$\bar{s} = dt$$

In an actual determination, corundum particles having elongated sections (having a length-to-width ratio of 2.5 or more) are observed within a given area of a SEM photograph, lines are drawn at given intervals and lengths of 100 or more intercepts between a pair of longer sides are measured to obtain an average value $\bar{l}$. In substantially the same view, an average area $\bar{s}$ of 50 or more elongated sections is obtained. t and d are then obtained from $\bar{l}$ and $\bar{s}$.

According to the results of the experiments conducted by the inventors, it has turned out that a sintered body having a high toughness can be obtained if a ratio of the average diameter of the plate-shaped particles to the thickness thereof, while approximating them as thin discs, is 8 or more.

(Method for Measuring Fracture Toughness)

Various methods have heretofore been proposed for measuring a fracture toughness, but the indentation microfracture method (hereinafter referred to as IM method) using a Vickers indenter is employed here. More specifically, a surface of a pellet-form specimen is polished to become a mirror surface, an indent is formed at a load of 30 kg and a fracture toughness $K_{Ic}$ is obtained from the size of the indent and the length of cracks by using the formula for median crack (m.c.) proposed by Niihar (Koichi Niihara, Ceramics 20 (1) 12-18(1985)).

$$K_{Ic}/Ha^{\frac{1}{2}} = 0.203 \, (c/a)^{-3/2}$$

where $K_{Ic}$ is a fracture toughness (unit MPa·m$^{\frac{1}{2}}$), H is a dent (unit: m) and c is $\frac{1}{2}$ of a length of a surface crack (unit: m).

(Determination of Components)

The main components $Al_2O_3$ and $TiO_2$ of the composite powder and the sintered body are determined by alkali fusing the samples with alkali, dissolving them into a nitric acid solution and using Y (yttrium) as an internal standard to carry out ICP emission spectrography. The determination of Na is also carried out by ICP emission spectrography after the samples are decomposed by a mixture of hydrofluoric acid, sulphuric acid and ammonium sulfate. Other metal impurities are semi-quantitatively analyzed by arc emission spectrography. The analysis of the chlorine ion remaining in the powder is carried out by dispersing the powder into water, heating the dispersion, letting chlorine ion be precipitated by silver nitrate in an excess amount, and back-titrating the remaining silver ion by ammonium thiocyanate in the presence of ferric ion.

(Example 1)

In the manufacturing of the previous alumina-titania composite powder (as disclosed in Japanese Patent Application No. 60-214237 or Hori, Ishii, Yoshimura and Somiya, Yogyo-Kyokai-shi 94 (4) 400-408 (1986)), alumina refractories, more particularly fusion-cast alumina refractories, for example, Marsnite G manufactured and sold by Asahi Glass Co., Ltd. is used for lining refractories of a reactor. The alumina refractories contain a small amount of alkali metal (most of them are sodium). But as the refractories have been treated at a high temperature and especially in the case of Marsnite G, it is a fusion-cast product which has been set from the melt, they are chemically stable, highly abrasion-resistant and hardly causes evaporation or dissolution of alkali therefrom even in a high-temperature acidic atmosphere. Therefore, an amount of an alkali component, e.g. a sodium component, incorporated in the product alumina-titania composite powder is very little, usually as little as 0.01 wt % or less.

In order to add sodium to the composite powder, instead of using a lining of the alumina refractories, 100 parts by weight of a castable powder (maximum particle size about 1 mm) of zirconia partially stabilized by calcium oxide are added with 3 parts by weight of sodium tripolyphosphate and about 7 parts by weight of water, kneaded well, cast into a reactor shell formed from a stainless steel pipe having a nominal diameter of 4 inches as shown in FIG. 1 and shaped to have the following sizes:

Mixing Section: inner diameter of refractories 50 mm, length 60 mm

Contracting Section reduced in diameter over a length of 20 mm from the inner diameter of the refractories at the mixing section to 30 mm of the inner diameter of the refractories at the reaction section Reaction Section: inner diameter of refractories 30 mm, length 200 mm To remove moisture in the refractories layer, a combustion gas of an open torch is led and heat-treated at a temperature up to 800° C. The resultant refractories-lined reactor is fitted to the apparatus for use.

An apparatus substantially the same as that of Japanese Patent Application except that the lining of the reactor is changed from the alumina refractories to the zirconia refractories containing sodium is employed to manufacture the composite corundum-rutile powder by the following preparing conditions:

| Preparing Conditions | |
|---|---|
| AlCl$_3$ vaporizer temperature (°C.) | 150 |
| AlCl$_3$ carrier N$_2$ (Nm$^3$/h) | 0.35 |
| (Fed amount of AlCl$_3$ (g/h)) | 83 |
| Fed amount of TiCl$_4$ (g/h) | 70 |
| TiCl$_4$ carrier N$_2$ (Nm$^3$/h) | 0.47 |
| N$_2$ for protecting blowing nozzle (Nm$^3$/h) | 0.10 |
| N$_2$ for burner (Nm$^3$/h) | 0.80 |
| O$_2$ for burner (Nm$^3$/h) | 0.90 |
| Pressure | atmospheric pressure |
| Mixing section temp. (°C.) | 1600 |
| Reaction section exit temp. (°C.) | 980 |
| (Retention time in mixing section (msec)) | 25 |
| (Retention time in reacting section (msec)) | 50 |

Sodium was dissolved from the lining refractories into the powder and the sodium content in the powder became 0.12 wt %. Less than 0.1 wt % of metals such as Zr, Si, Fe and Ca were detected as impurities and these were considered to be contained in the form of oxides. The powder further contained about 2 wt % of moisture and 200 ppm of chlorine ion.

To eliminate chlorine ion which has a detrimental effect on the sintering, the powder is calcined at 800° C. for one hour. After the calcination, the crystalline phases of the powder were mainly γ- or δ-alumina and rutile-titania and trace amounts of anatase-titania were also detected, but no α(corundum)-alumina was detected. The identification of crystalline phases of the composite powder and the sintered body was carried out by powder X-ray diffractometry using CuKα ray. The average particle size of the powder was 40 nm and there were not many particles having a particle size of 20 nm or less. The average particle size of the composite powder was obtained by measuring sizes of 200 or more particles in the photograph taken by transmission electron microscope (TEM).

On the other hand, the rutile crystallite size was 18 nm. The measurement of the rutile crystallite size of the composite powder was obtained based on Scherrer's equation by correcting the half value width of the X-ray diffraction peak of rutile-titania (1 1 0) with (1 1 1) peak of silicon added as the internal standard.

The lattice constant $c_0$ of the rutile is 2.9575 Å and it is remarkably deviated from a theoretical value of 2.9592 Å due to the solid solution of alumina. With respect to the composite powder, the lattice constant $c_0$ is determined from d-spacings of 4 or more diffraction peaks of the rutile-phase $TiO_2$ by the least squares method, while using silicon as an internal standard.

From a difference between the particle size of the powder and a rutile crystallite diameter, and a deviation of the lattice constant of the rutile, it is inferred that the rutile crystallites are dispersed in each particle together with alumina and that alumina forms solid solution into rutile crystallites.

3 Parts by weight of Yukanol NCS (trade name of nonionic surfactant manufactured and sold by Tetsuno Yuka Kabushiki Kaisha) was added to 100 parts by weight of calcined powder and the mixture was subjected to ballmill treatment using a plastic vessel and balls, with water as a solvent, then dried, granulated and shaped into pellets (sintered dimensions: about 10 mm $\phi$ × 5 mm t) at a pressure of 3 ton/cm². The fully dried pellets were sintered in air atmosphere at a temperature of 1250° C. under normal pressures. The sintering times were from 1 to 14 hours.

The sintered pellets were polished and subjected to density measurement, crystalline-phase identification, SEM observation, and toughness measurement. The density measurement was carried out by an Archimedean method using water: which showed no difference from the one obtained by size and weight. In the identification of the crystalline phase by the X-ray diffractometry corundum ($\alpha$)-phase alumina and rutile-phase titania were main phase detected on the surface of the sintered body and small amounts of $\beta$-$Al_2TiO_5$ and a bronze-type compound similar to $Na_2Ti_2Ti_6O_{16}$ or $Na_2Fe_2Ti_6O_{16}$ were also detected on the surface. However, $\beta$-$Al_2TiO_5$ or the bronze compound were not found inside of the sintered body when the sintered body was ground or sectioned and inspected by X-ray diffractometry.

In the SEM observation, the backscattered electron image of the polished face was taken to determine a volume fraction, an average diameter and an average thickness of plate-shaped corundum particles as described above. The backscattered electron image was taken reversely to show the corundum particles in white, for improving the visibility. The toughness was determined by IM method as referred above and four to six measurements were carried out for one sample.

Figure 2:
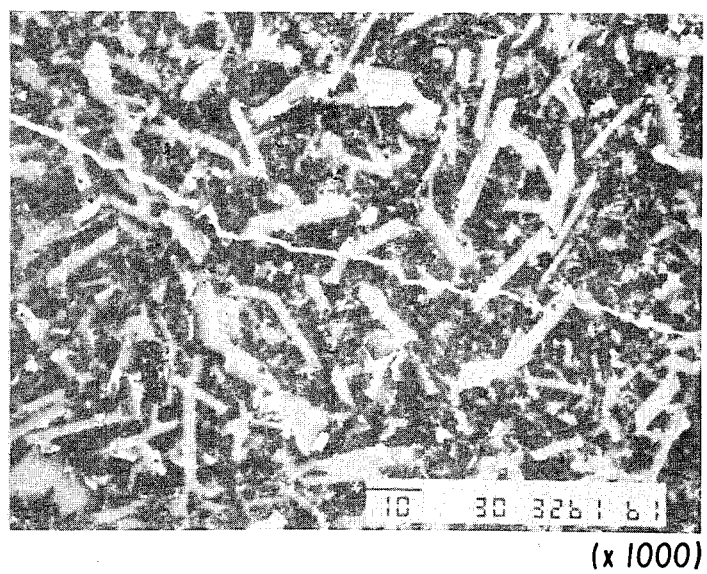
FIG. 2 is an electron micrograph ($\times 1000$) of the sintered body obtained in Example 1 after sintering at 1250° C. for 9 hours, showing an interaction between the plate-shaped particles and the crack.

The results of the experiments are summarized in Table 2. Both the volume % of the corundum particles and the fracture toughness were increased with the sintering time. The fracture toughness $K_{Ic}$ was 5 MPa·m$^{\frac{1}{2}}$ after 3-hour sintering and further improved to 6 MPa·m$^{\frac{1}{2}}$ or more by sintering for 9 to 14 hours. The interaction between the plate-shaped corundum particles and cracks are illustrated in FIG. 2. The cracks caused by the Vickers indenter were effectively deflected by the plate-shaped particles, thus showing a typical deflection toughening effect. The photograph of FIG. 2 is a reversed backscattered electron image by a scanning electron microscope (SEM) and alumina appears white.

According to Faber et al, it is considered that the crack deflection toughening is more effective when the shape anisotropy (aspect ratio) of the particles are high.

Also they pointed out that a considerable effect can be obtained when the volume fraction of the dispersed particles is increased to about 5% but no remarkable further improvement can be expected even if the volume fraction reaches 20% or more. However, these experiments conducted by the inventors shows that the relationship between the amounts of the plate particles and the toughness is approximately linear.

Faber et al has considered that a relatively low volume fraction of the dispersed particle suffices to have a toughening effect, taking not only an effect of crack tilting by the dispersed particles but also an effect of twisting by the particles into account. However, the contribution of the twisting to toughening is not considered to be so much in this composite corundum-rutile sintered body, at least, from the results of the experiments, namely, the relationship between the volume fraction and the toughness, and the behavior of the propagating cracks.

The theoretical density and the relative density are obtained as follows:

When the composite sintered body is formed mainly of $Al_2O_3$ and $TiO_2$ and contains an alkali metal in an amount of only 0.5 wt % or less, the sintered body may be approximated to be a sintered body formed only of corundum-($\alpha$-)phase $Al_2O_3$ and rutile-phase $TiO_2$. If the analyzed values of $Al_2O_3$ and $TiO_2$ are normalized and assumed to be A wt % and (100 - A) wt %, respectively, then the theoretical density of the composite sintered body can be obtained by the following equation, because the theoretical densities of $\alpha$-$Al_2O_3$ and rutile-phase $TiO_2$ are 3.987 g/cm³ and 4.250 g/cm³ (JCPDS Powder Diffraction File).

$$\text{Theoretical density (g/cm}^3\text{)} = \frac{100}{\frac{A}{3.987} + \frac{100 - A}{4.250}}$$

A relative density is obtained from the measured density and the theoretical density according to the following formula:

$$\text{Relative density (\%)} = \frac{\text{Measured density (g/cm}^3\text{)}}{\text{Theoretical density (g/cm}^3\text{)}} \times 100$$

A difference between the theoretical density and the measured density is considered a porosity and the porosity is obtained by the following formula:

Porosity (%) =

$$\frac{\text{Theoretical density(g/cm}^3\text{)} - \text{Measured density(g/cm}^3\text{)}}{\text{Theoretical density (g/cm}^3\text{)}} \times 100$$

(Example 2)

The same powder same as in Example 1 was used and sintered at 1250° C. at atmospheric pressure for one hour as in Example 1. Thereafter, the powder was subjected to post-sintering in an atmosphere of argon at 1200° C. at 1000 kg/cm² for one hour by HIP (hot isostatic pressing). The powder was further sintered in air at 1250° C. for three hours. After the HIP treatment, the samples of pellet form were turned black due to lack of oxygen in rutile-phase $TiO_2$, but they returned to light brown after the second sintering after HIP.

Figure 4:
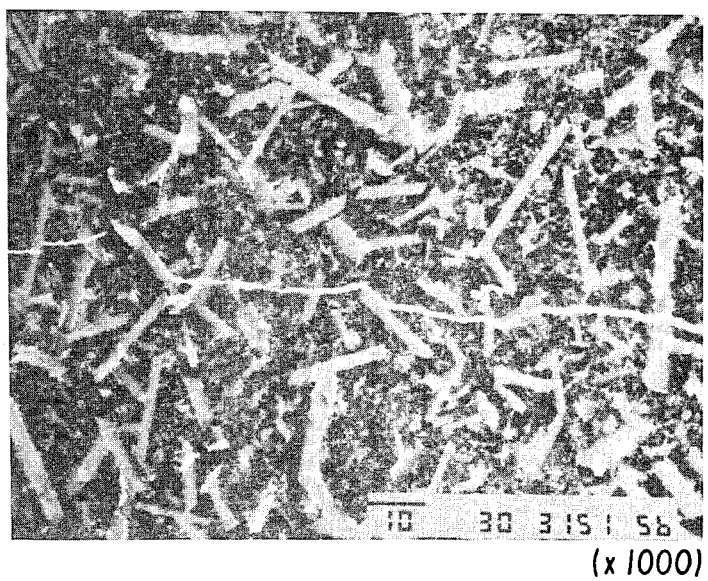
FIG. 4 is an electron micrograph ($\times 1000$) of the sintered body obtained in Example 2, showing an interaction between the plate-shaped particles and the crack.
Figure 3:
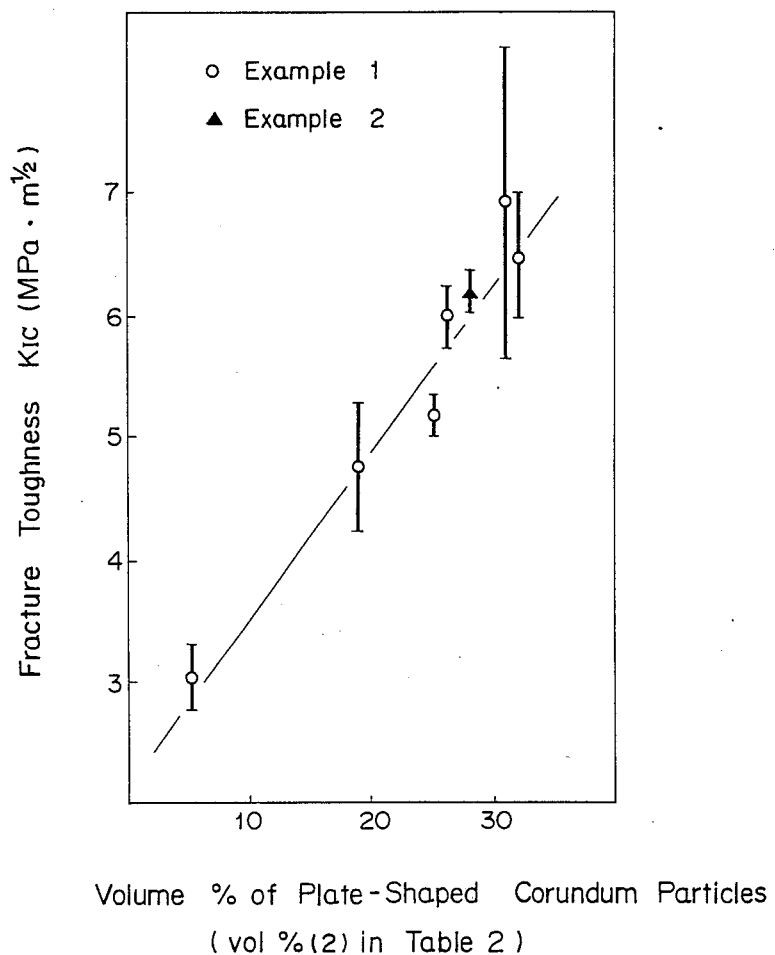
FIG. 3 is a graph showing a relationship between the amount (vol %) of the plate-shaped corundum particles and the fracture toughness $K_{Ic}$ ($MPa \cdot m^{\frac{1}{2}}$) in the sintered materials of Examples 1 and 2.

The samples after the second sintering were subjected to measurement. The results were as follows: the density was 4.108 g/cm³ (100% TD): the fracture toughness $K_{Ic}$ was 6.20±0.17 MPa·m^½; *the volume % of the plate-shaped corundum particles was* 23,6 % for the elongated sections alone and 28.3 % when including other sections; the average diameter was 11.9 μm; and the average thickness was 1.12 μm. The interaction between the plate-shaped particles of the samples and the cracks are shown by an electron micrograph in FIG. 4. FIG. 3 which shows a relationship between the volume % of the plate particles and the fracture toughness ($K_{Ic}$) of Example 1 also shows the data of Example 2. Both the data of Example 1 and Example 2 are substantially on the same line and it can be seen from the results that a high toughness can also be assured when the HIP treatment is employed in combination.

(Comparative Example 1)

An apparatus as disclosed in Japanese Patent Application No. 60-214237 was employed, with the lining refractories of the reactor being made of fused-cast alumina refractories. In this case, incorporation of sodium was hardly caused as different from Example 1 in which zirconia refractories including sodium were employed.

The preparing conditions were substantially the same as those of Example 1 except for the following:

| | |
|---|---|
| AlCl₃ N₂ carrier (Nm³/h) | 0.32 |
| (Feed amount of AlCl₃ (g/h)) | 76 |
| Feed amount of TiCl₄ (g/h) | 80 |
| TiCl₄ N₂ carrier (Nm³/h) | 0.50 |

The resulting alumina-titania composite powder had a weight ratio of alumina to titania of 46.3:53.7 and a sodium content of 0.006 wt %. The crystalline phases, particle size and lattice constant of the powder were substantially the same as those of the powder of Example 1 except that the sodium content was much lower and the component ratio of alumina and titania is slightly different.

Figure 5:
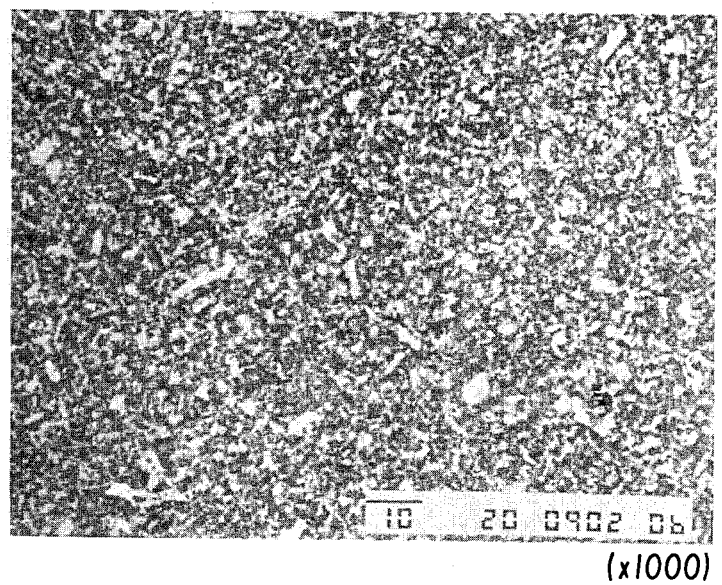
FIG. 5 is a scanning-electron micrograph ($\times 1000$) of the sintered body obtained in Comparative Example 1, showing the distribution of the corundum particles and the rutile particles.

Following similar pretreatment and shaping, the powder was sintered at 1250° C. for 6 hours. However, the resultant sintered body was not densified more than 90.9 % of relative density and its fracture toughness was as low as 2.84±0.09 MPa·m^½. The microstructure of this sintered body is shown in FIG. 5, in which plate-shaped corundum particles are hardly found. The photograph of FIG. 5 shows corundum particles white and rutile particles dark.

(Example 3)

Anhydrous sodium carbonate was mixed with the calcined powder of Comparative Example 1 in water in such an amount that the sodium content should be 0.2 wt %. 3 parts by weight of nonionic surfactant, i.e., Yukanol NCS, was added to 100 parts by weight of the powder and subjected to ball-milling.

The so prepared powder was analyzed and found to be of the following composition the weight ratio of alumina to titania was 44.5:55.5 and the sodium content was 0.18 wt %.

This powder was shaped in a manner substantially the same as n Example 1 and sintered at 1250° C. at atmospheric pressure for 6 hours. The resultant sintered body showed a relative density as high as 99.0 % and a fracture toughness ($K_{Ic}$) of 5.51 % 0.32 MPa·m^½.

In addition, the powder was shaped into bar specimens, sintered and subjected to measurement of flexural strength. The flexural strength of the sintered body was 45.7±9.9 kg/mm². This measurement was similar to JIS R1601, the flexural strength measuring method for fine ceramics. However, in the present example, the test was conducted by using only four to six samples and bending them at three points with span of 16 mm.

The volume % of the plate-shaped corundum particles in the samples was 19.2 % when it was based only on the elongated sections and 23.3 % when other sections were included. The determination of the size of the plate-shaped particles was not carried out, but the particle size is a slightly smaller than that of the material sintered for 6 hours in Example 1.

This example shows that a sintered body of high toughness having well-grown plate-shaped corundum particles could be obtained even when a sodium salt was externally added to the powder.

However, in a sample of this example which was sintered at 1250° C. for only one hour, the relative density was not more than 94.3% and the sinterability was rather poor, despite increased sodium content. Thus, it is considered that sodium is preferably added during the reaction to produce the alumina-titania composite powder as in Example 1.

(Comparative Example 2)

A powder of Example 3 was shaped and sintered at 1310° C. for 6 hours. After sintering, the samples were ground and subjected to X-ray diffractometry to inspect the crystalline phases. The crystalline phases comprised mainly β-aluminum titanate and rutile-titania. A trace amount of corundum-alumina was also found. Because the powder was sintered at a temperature higher than 1280° C., β-aluminum titanate was produced by a reaction between corundum-alumina and rutile-titania. The obtained sintered body had a density of 3.594 g/cm³ and the relative density was calculated to be 94.5 %, assuming that the sintered body was formed of aluminum titanate and rutile-phase $TiO_2$. The sintered body had considerable porosity due to microcracks which was caused by production of aluminum titanate. As the fracture toughness of aluminum titanate can not be measured by the IM method due to a number of microcracks caused, polished bar-specimens were used to measure the bending strength. The strength was measured as low as 3.0±0.3 kg/mm². If the bending test had been carried out without grinding, the bending strength would have been a little higher, but it would never be more than 10 kg/mm².

The present invention contemplates to provide a material which stands heat, abrasion and mechanical impacts. The material obtained in this comparative example is not satisfactory in the density nor in strength.

(Example 4)

A reactor having zirconia refractories including sodium as in Example 1 was used to prepare an alumina-titania composite powder having a rather high alumina content. The weight ratio of alumina to titania was 73.0:27.0 and the sodium content was 0.045 wt %.

The preparing conditions were substantially the same as those of Example 1 except for the following:

| | |
|---|---|
| AlCl₃ N₂ carrier (Nm³/h) | 0.48 |
| (Fed amount of AlCl₃ (g/h)) | 115 |
| Fed amount of TiCl₄ (g/h) | 40 |
| TiCl₄ N₂carrier (Nm³/h) | 0.34 |

Figure 6:
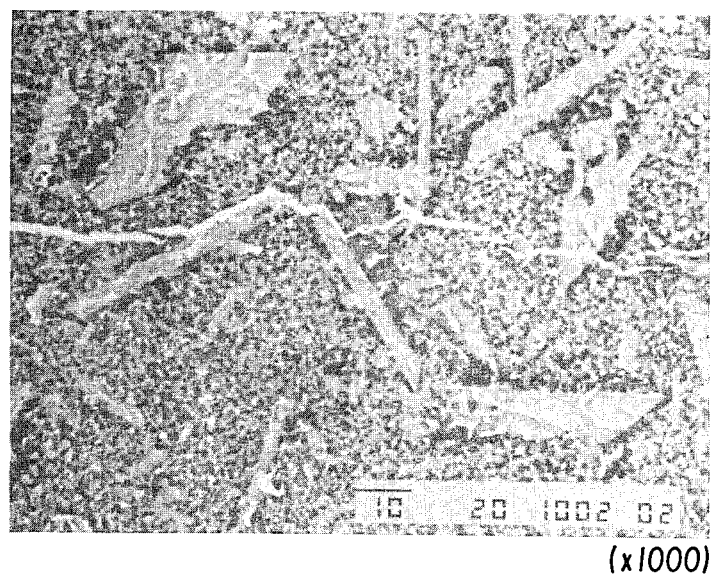
FIG. 6 is an electron micrograph ($\times 1000$) of the sintered body obtained in Example 4, showing an interaction between the plate-shaped particles and the crack.

This powder was treated, shaped and sintered at 1275° C. for 6 hours as in Example 1 to obtain a sintered material having a relative density of 98.2 %. The fracture toughness of this sintered body was as high as 6.82±0.63 MPa·m$^{\frac{1}{2}}$. The interaction between cracks and plate-shaped particles in the sample of this example are shown in FIG. 6.

The volume % of the late corundum particles was 17.5 % based only on elongated sections and 20.3 % when including other sections, too. The average diameter of the particle was 27.0 μm and the average thickness was 2.83 μm. The sintered body of this Example had characteristics that it is a bit difficult to be densified and that the size of the plate-shaped particles was larger as compared with the foregoing examples.

The characteristics of the present powder are considered to be due to its low alkali content and large weight ratio of alumina to titania. This example showed that the corundum plate particles could grow and a high toughness could be attained by sintering the powder at a relatively higher temperature for a longer hours even when the alkali metal content was rather low and the weight ratio of alumina to titania was high.

(Comparative Example 3)

An apparatus as used in Example 1 was used to prepare powders comprising alumina alone and titania alone, respectively.

The preparing conditions of Al₂O₃ powder is substantially the same as those of Example 1 except for the following conditions;

| | |
|---|---|
| AlCl₃ vaporizer temperature | 150° C. |
| AlCl₃ carrier N₂ | 0.6 Nm³/h |
| (Feed amount of AlCl₃ | 140 g/h) |
| Feed amount of TiCl₄ | None |
| TiCl₄ carrier N₂ | 0.22 Nm³/h |

The preparing conditions of TiO₂ powder is substantially the same as those of Example 1 except for the following conditions;

| | |
|---|---|
| AlCl₃ vaporizer temperature (AlCl₃ were not charged though) | 150° C. |
| AlCl₃ carrier N₂ | 0.22 Nm³/h |
| Feed amount of TiCl₄ | 140 g/h |
| TiCl₄ carrier N₂ | 0.6 Nm³/h |

The powder made of alumina alone had a crystalline phase of δ (delta) and contained 0.34 wt % of sodium, while the powder made of titania alone had crystalline phase of anatase and little rutile and contained 0.11 wt % of sodium.

These two powders were calcined at 800° C. for one hour and prepared to have the same weight ratio of alumina to titania as that of Example 1. Thereafter, the powder was pretreated, shaped and sintered at 1250° C. for 6 hours as in Example 1. The relative density was not more than 81.7 % and growth of corundum plate particles was not observed.

This comparative example showed that a high sodium content is not sufficient to obtain a dense corundum-rutile composite sintered body having plate-shaped corundum particles and that it is essential to employ alumina-titania composite powders.

(Effects of the Invention)

A sintered body formed of corundum-alumina and rutile-titania which is prepared by adding an alkali metal to an alumina-titania composite powder produced by a vapor-phase oxidation of AlCl₃ and TiCl₄, in the course of the oxidation reaction or by a treatment of the powder after the reaction; and sintering the powder at a temperature not lower than a minimum temperature at which a liquid phase is produced by a small amount of alkali metal oxide and titania and not higher than 1280° C. has the following characteristics which have never been obtained before:

(1) Heretofore, ceramics having a good toughness have been obtained only from expensive materials such as a non-oxide or zirconia. The sintered body of the present invention can have a high toughness by the compounding inexpensive oxides such as alumina and titania.

(2) Being different from the previously known oxide ceramics having high toughness, the toughening mechanism of the present sintered body is due to a crack deflection effect by shape-anisotropic particles which are dispersed in the material, and therefore the toughness is not much deteriorated at high temperatures.

(3) The sintered body of the present invention is made of corundum-alumina and rutile-titania and has a dense structure in which plate-shaped corundum particles are dispersed, which has never been prepared before. This sintered body is prepared by adding an alkali metal to an alumina-titania composite powder composed mainly of γ-or δ-alumina and rutile titania and obtained by a vapor-phase reaction, and sintering the powder at relatively low temperatures for an adequate time.

TABLE 1

Estimation of Minimum Temp. Where Liquid Phase Is Formed by a small Amount of Alkali Metal Oxide and Titania

| Alkali Metal Oxide | Minimum Temp. of Liquid Formation | FIG. No. in* |
|---|---|---|
| Li₂O | 1230° C. | FIG. 185 |
| Na₂O | 1130° C. | FIG. 193–194 |
| K₂O | 1250° C. | FIG. 169 |
| Rb₂O | 1160° C. | FIG. 201 |
| Cs₂O | 1110° C. | FIG. 161 |

*Phase Diagrams for Ceramists, The American Ceramic Society, 1964

TABLE 2

Change of Microstructural Parameters and Fracture Toughness
of Sintered Body of Example 1 as a Function of Sintering Time

| 1250° C. Sintering time | Density of Sntrd Body g/cm³ | % TD | Average Particle Size in Matrix (μM) | Plate-shaped Corundum Particles | | | | Fracture Toughness $K_{IC}$ (MPa · m^½) |
|---|---|---|---|---|---|---|---|---|
| | | | | vol % (1) | vol % (2) | diameter (μm) | thickness (μm) | |
| 1 | 4.018 | 97.8 | about 0.3 | 4.9 | 5.2 | 7.7 | 0.63 | 3.04 ± 0.24 |
| 3 | 4.092 | 99.6 | about 0.5 | 16.6 | 19.3 | 11.2 | 1.03 | 4.78 ± 0.52 |
| 6 | 4.069 | 99.0 | about 0.8 | 22.4 | 25.2 | 11.6 | 1.30 | 5.19 ± 0.14 |
| 9 | 4.094 | 99.7 | about 1.0 | 23.1 | 26.5 | 12.7 | 1.31 | 6.01 ± 0.24 |
| 11 | 4.096 | 99.7 | about 1.5 | 27.3 | 31.4 | 14.5 | 1.70 | 6.94 ± 1.34 |
| 14 | 4.089 | 99.5 | about 2.0 | 26.0 | 32.1 | 12.7 | 1.45 | 6.48 ± 0.51 |

Notes:
(1)Calculated values based on sufficiently elongated sections (having a length-to-width tation of 2.5 or more) under observation by SEM
(2)Calculated values based on sections further including large ellipsis sections in addition to the sections (1) above

I claim:

1. A corundum-rutile composite sintered body of high toughness consisting essentially of alumina of corundum phase and titania of rutile phase, which contains alkali metal, existing in oxide form, in an amount of about 0.01 to 0.5 wt % and plate-shaped corundum particles whose cross sections having aspect ratios of about 2.5 or more are observed to be about 10 vol % or more by scanning electron microscopy, wherein the content of alumina is about 10 to 90 wt % and the remainder is substantially titania.

2. A corundum-rutile composite sintered body of high toughness as claimed in claim 1, wherein a mean diameter of plate-shaped particles, which is obtained by Fullman's statistical treatment of the corundum particles observed to be elongated plates, assuming thin discs, is about 50 μm or less.

3. A corundum-rutile composite sintered body of high toughness as claimed in claim 1, whose porosity is about 3% or less.

4. A corundum-rutile composite sintered body of high toughness as claimed in claim 1, wherein a ratio of a mean diameter to a mean thickness of plate-shaped corundum particles, which is obtained by Fullman's statistical treatment of the corundum particles observed to be elongated plates, assuming thin discs, is about 8 or more.

5. A corundum-rutile composite sintered body of high toughness as claimed in claim 1, wherein a mean size of the rutile particles obtained by the observation under the scanning electron microscope is smaller than about one third of a mean diameter of a plate-shaped corundum particles, which is obtained by Fullman's statistical treatment of the corundum plate-shaped particles on the basis of the observation under the scanning electron microscope.

6. A corundum-rutile composite sintered body of high toughness as claimed in claim 1, wherein the content of the corundum particles observed to be elongated plates is about 15 vol % or more.

7. A corundum-rutile composite sintered body of high toughness as claimed in claim 1, wherein the content of alumina is about 30 to 80 wt %.

8. A corundum-rutile composite sintered body of high toughness as claimed in claim 1, wherein the content of alkali metal, which exists in oxide form, is about 0.11 (inclusive) to 0.5 (inclusive) wt %.

9. A corundum-rutile composite sintered body of high toughness as claimed in claim 1, wherein the alkali metal is sodium.

* * * * *